Feb. 26, 1929. 1,703,756
W. E. WINE
FREIGHT CAR
Filed Nov. 8, 1926 10 Sheets-Sheet 2

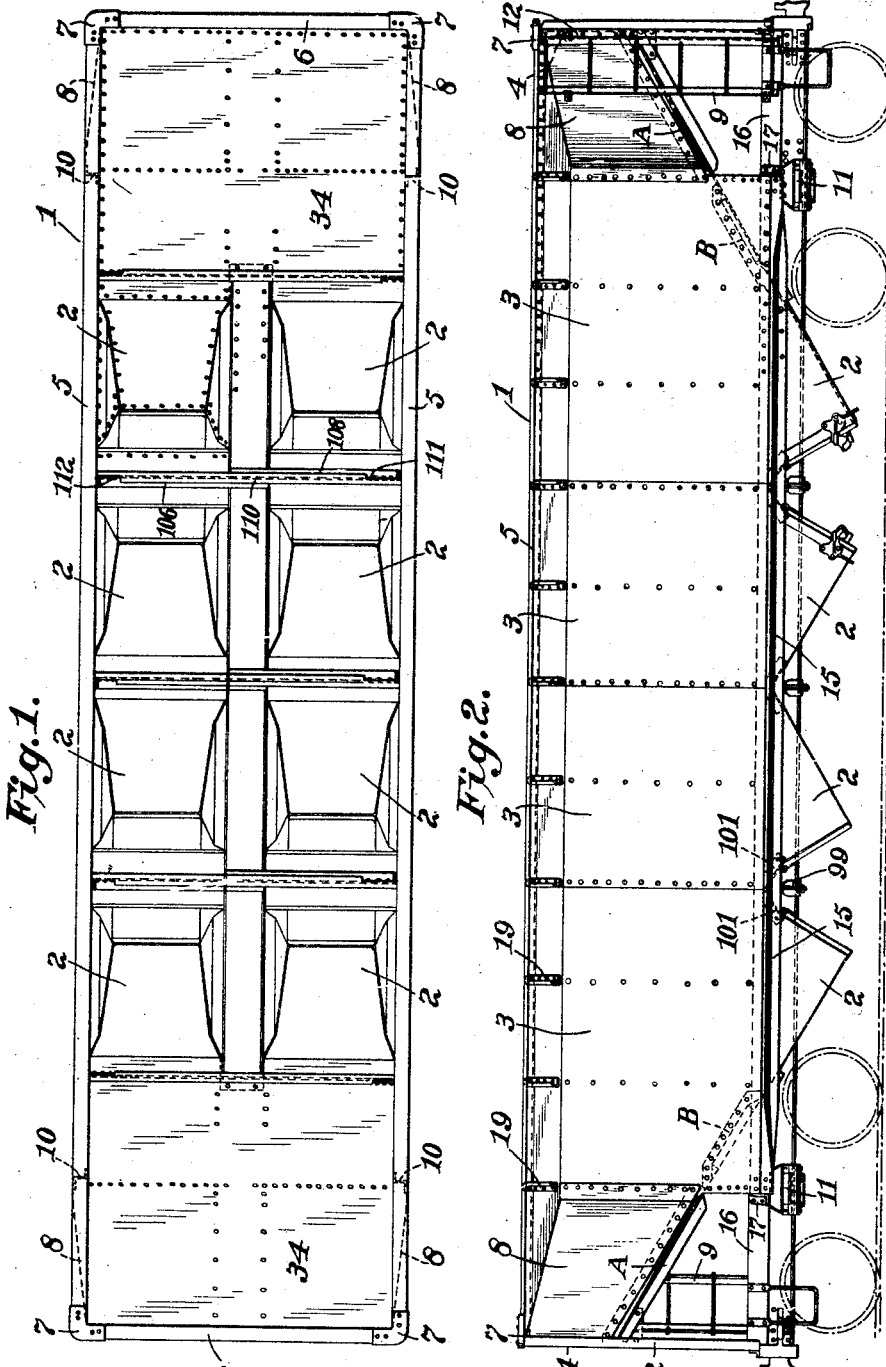

Inventor:
William E. Wine,
by Parker Cook,
Atty.

Feb. 26, 1929.

W. E. WINE

FREIGHT CAR

Filed Nov. 8, 1926 — 10 Sheets-Sheet 3

Inventor:
William E. Wine,
by Parker Cook.
Atty.

Feb. 26, 1929.

W. E. WINE 1,703,756

FREIGHT CAR

Filed Nov. 8, 1926     10 Sheets-Sheet 4

Inventor:
William E. Wine,
by Parker Cook
Atty.

Feb. 26, 1929.  
W. E. WINE  
1,703,756  
FREIGHT CAR  
Filed Nov. 8, 1926  10 Sheets-Sheet 5
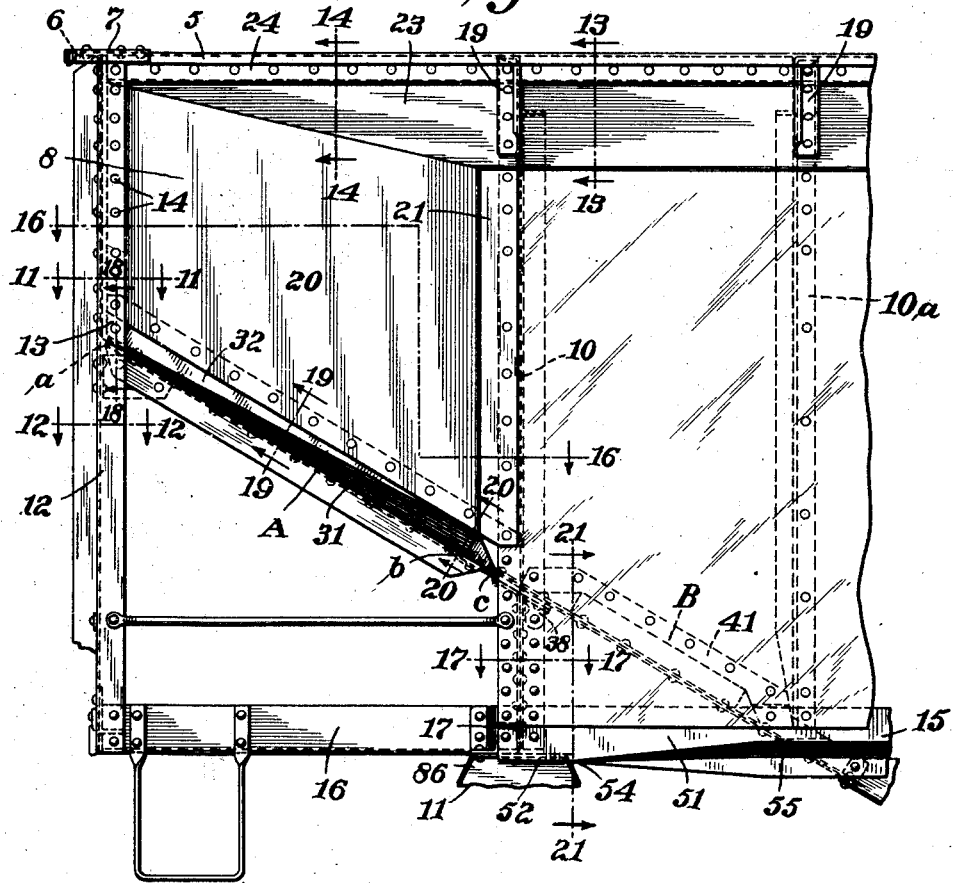
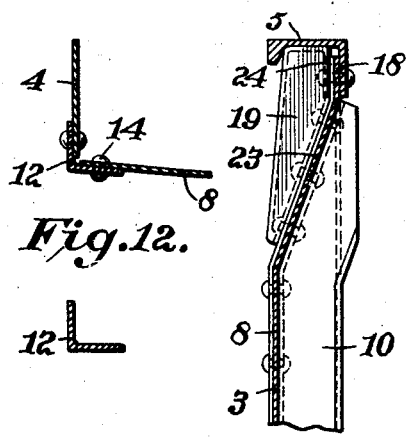
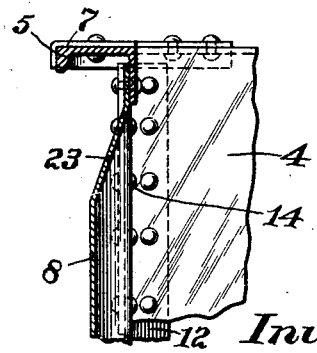
Inventor:  
William E. Wine,  
by Parker Cook,  
Atty.

Feb. 26, 1929.
W. E. WINE
FREIGHT CAR
1,703,756
Filed Nov. 8, 1926    10 Sheets-Sheet 6
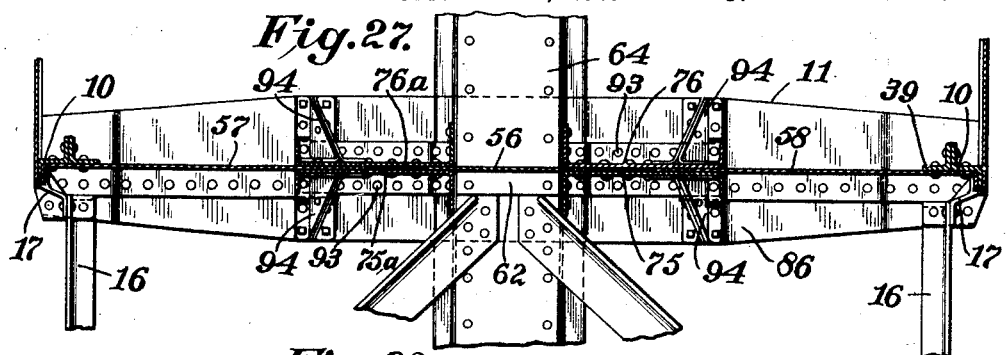
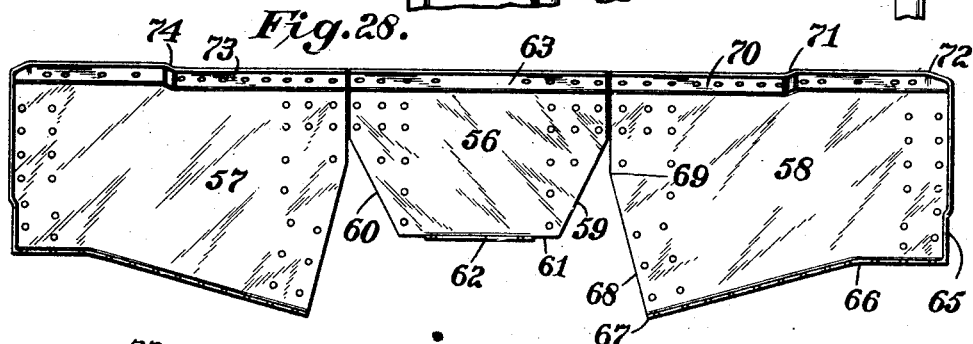
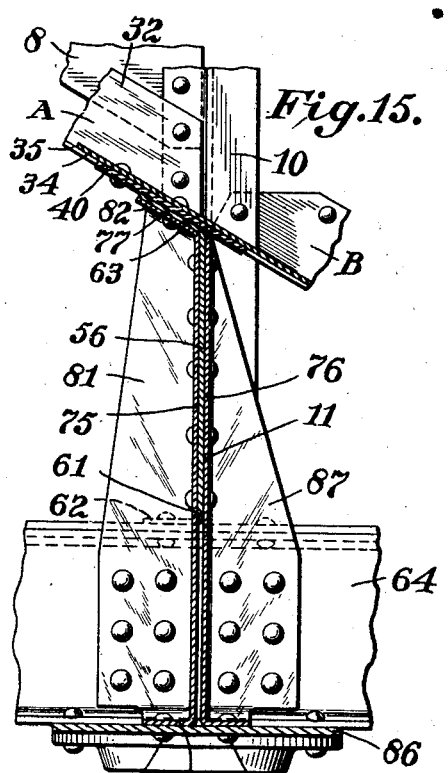
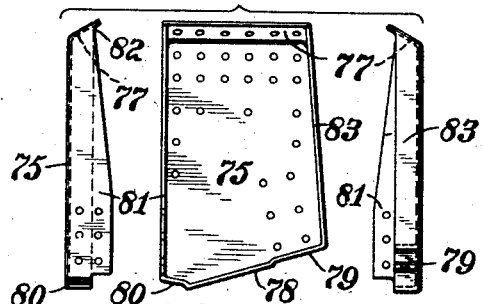
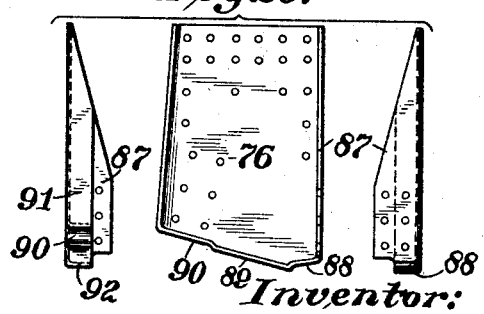
Inventor:
William E. Wine,
by Parker Cook.
Atty.

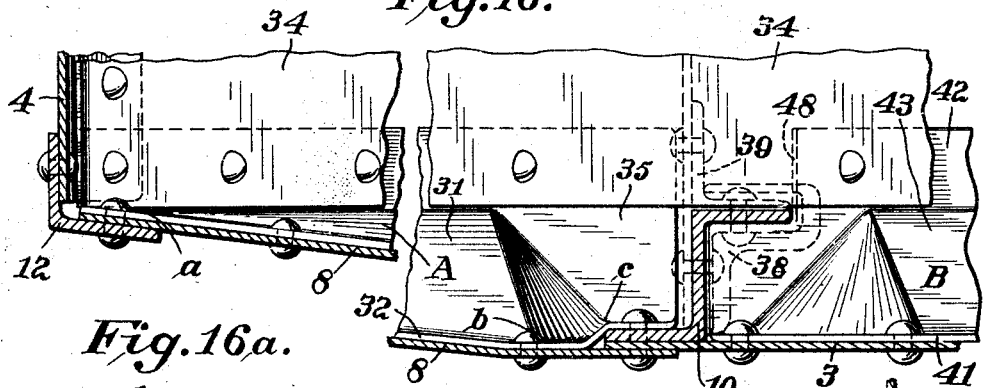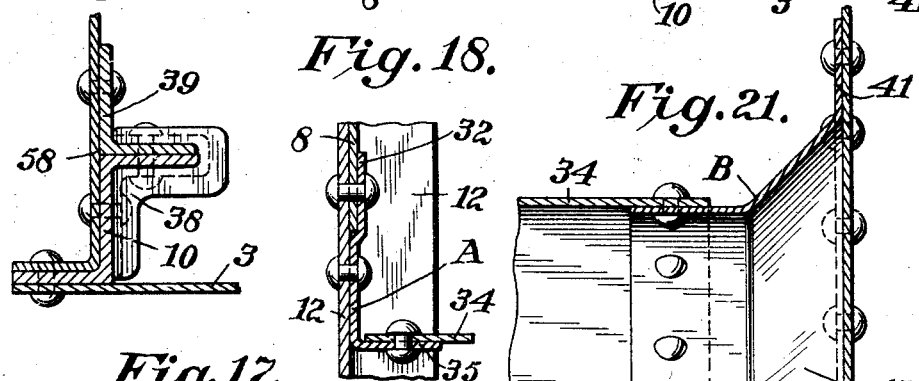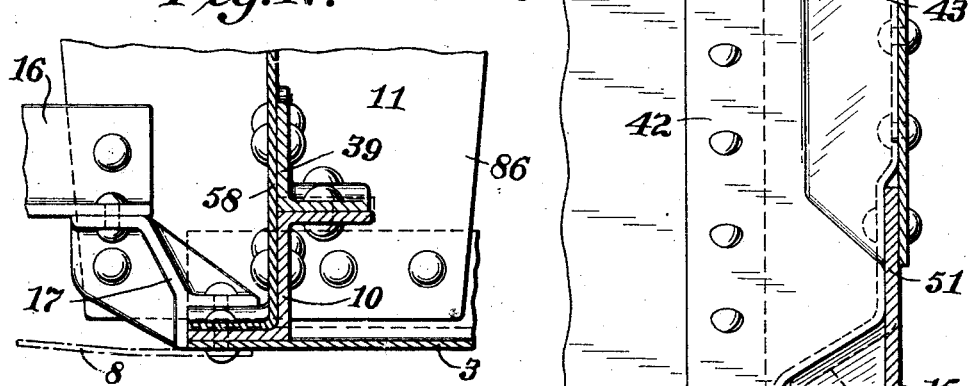

Feb. 26, 1929.  1,703,756
W. E. WINE
FREIGHT CAR
Filed Nov. 8, 1926 10 Sheets-Sheet 8
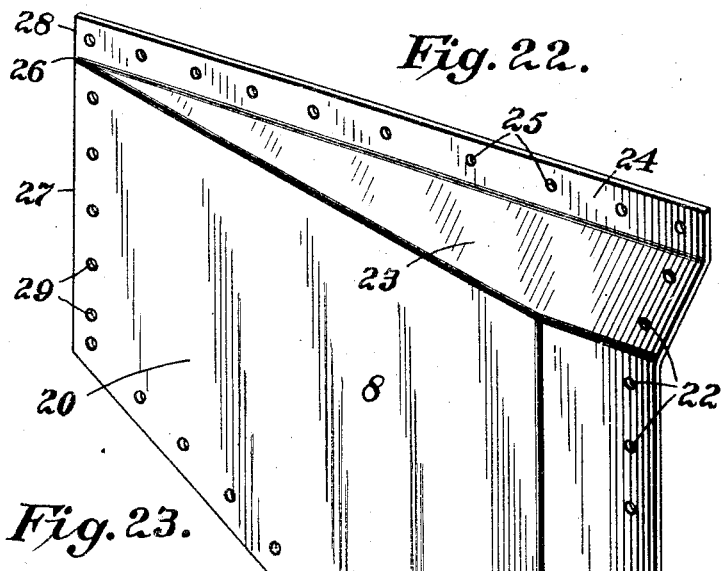
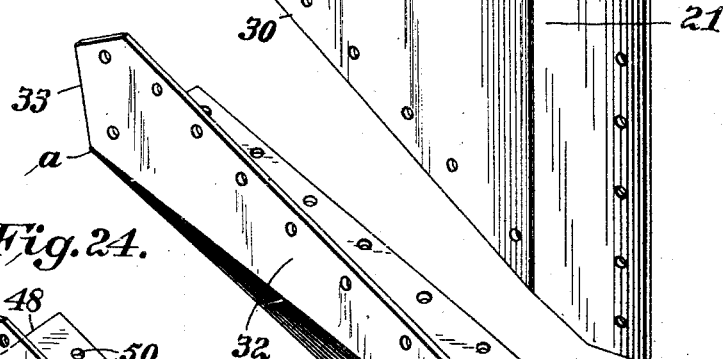
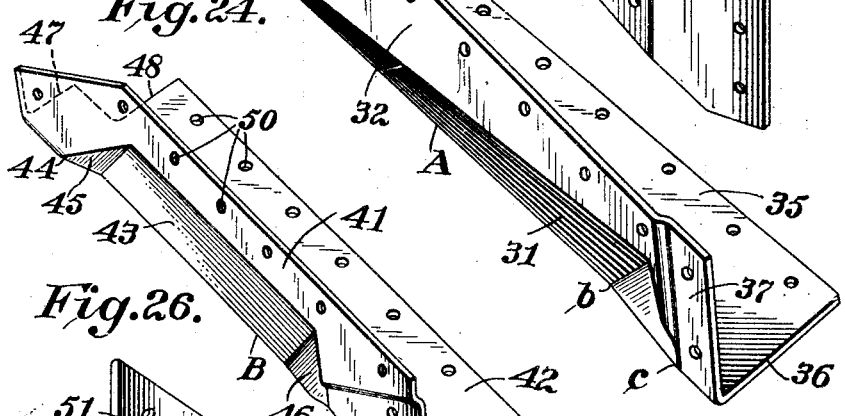
Inventor:
William E. Wine,
by Parker Cook,
Atty.

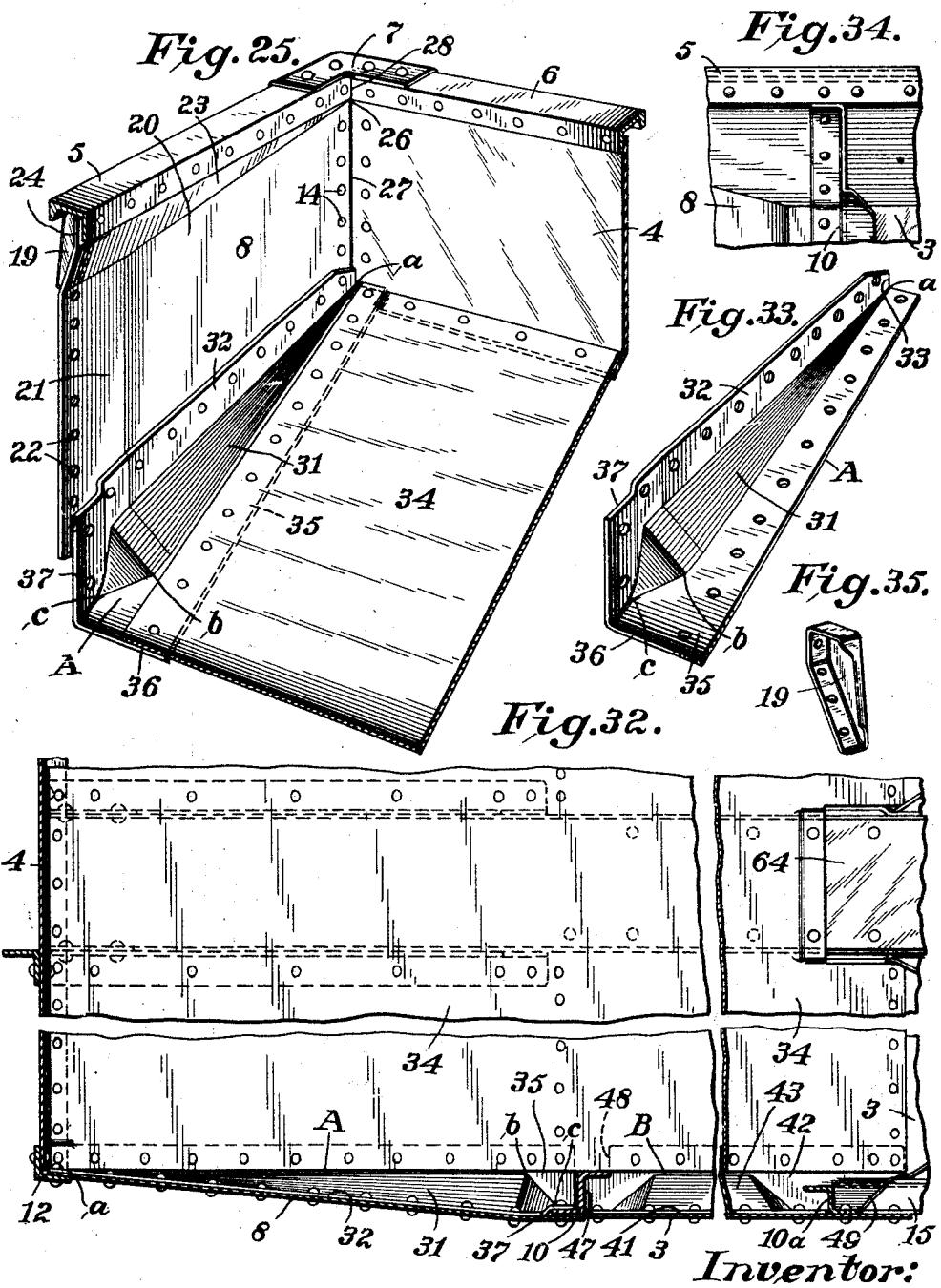

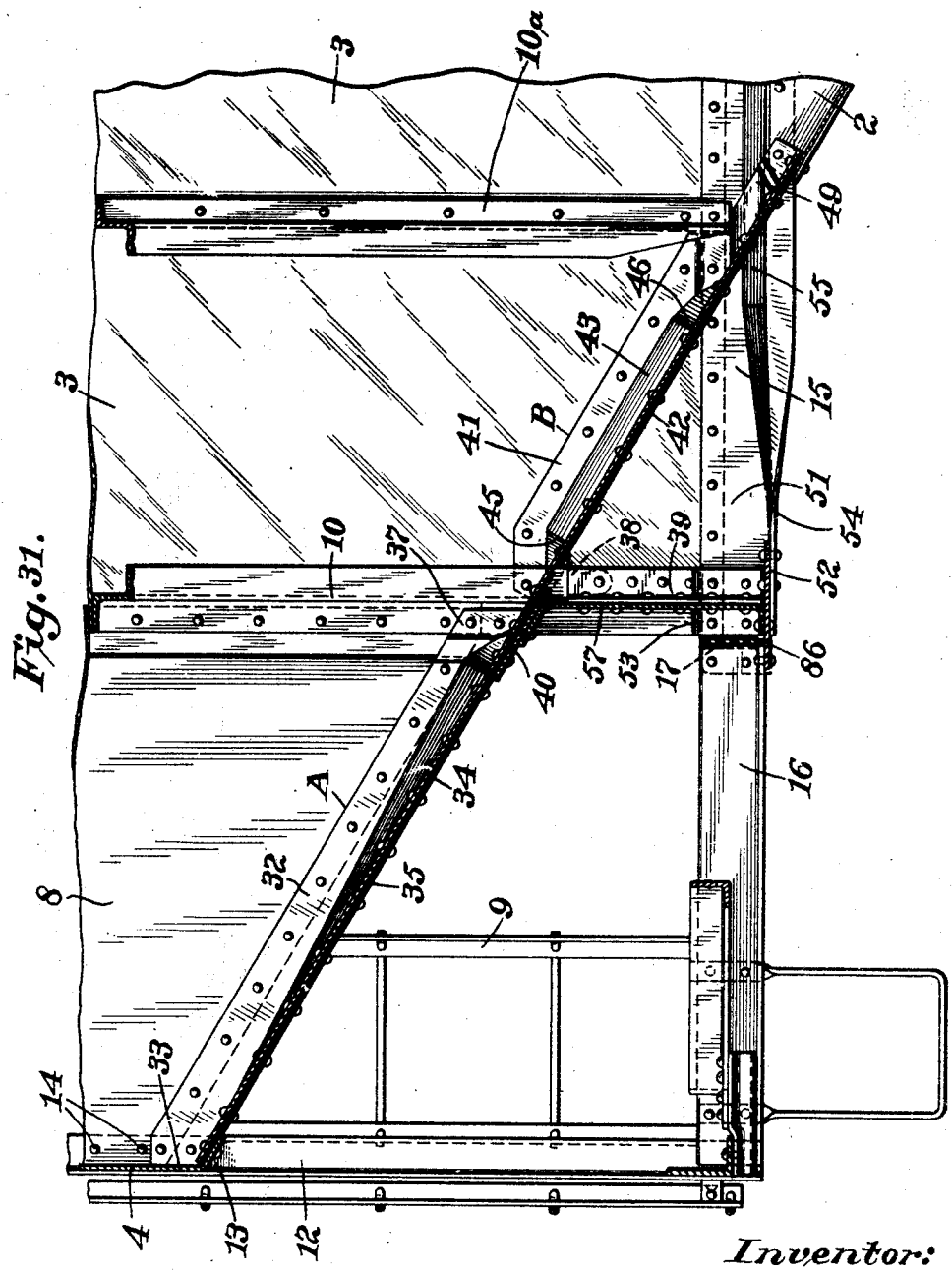

Patented Feb. 26, 1929.

1,703,756

UNITED STATES PATENT OFFICE.

WILLIAM E. WINE, OF TOLEDO, OHIO, ASSIGNOR TO WINE RAILWAY APPLIANCE COMPANY, OF TOLEDO, OHIO, A CORPORATION OF OHIO.

FREIGHT CAR.

Application filed November 8, 1926. Serial No. 146,977.

My invention relates to new and useful improvements in freight cars having a maximum capacity within the prescribed clearance limits, and at the same time so constructed that the safety appliances at the opposite ends of the side of the car will come within the limits which define the sides of the car.

One of the principal objects of the present invention is to provide a hopper car having novel form of end side sheets, so constructed as to incline inwardly from the normal sides of the car to the ends of the car, these end side sheets also having upper portions that converge from a certain width to a point, to thereby brace the sheets, and to furthermore permit the quick discharge of coal from the car if the same is inverted.

Still another object of the invention is to provide novel forms of "angles" that connect with and help support the slope sheets, and to further provide a special form of end side sheets used with the novel forms of angles, whereby an ever-widening trough is provided from the respective ends of the car towards the hoppers, so that the car will hold a maximum load and at the same time the trough formation will facilitate the quick movement of the coal down the slope sheets to the hoppers, at the respective ends of the car.

Still another object of the invention is to provide a bolster of composite form designed to cooperate with and support the slope sheets, and also to support the trough angles and the end sides of the car, as will be hereinafter more fully explained in the specification.

Still another object of the present invention is to provide a hopper car with novel type of bolsters, together with slope sheets and supporting angles, and end side sheets, so that the slope sheets merge with the angles which latter, in turn, connect with and merge with the end side sheets of the car.

Another object of the invention is to provide a novel form of freight car wherein the end side sheets extend inwardly and have certain portions merging with other portions so that there will be space provided for the safety appliances at the sides and ends of the car, and at the same time will facilitate the rapid loading and unloading of the car.

Another object of the invention is to provide a car with specially designed end side sheets that may be easily pressed out in large quantities at a minimum expense and applied to the superstructure of the car with the facilities of the average railroad company's repair shop.

Still another object of the invention is to provide a composite form of bolster that will support the slope sheets and at the same time provide five thicknesses of metal over the wear plates of the side bearings.

Still another object of the invention is to provide novel forms of side sills that extend between the respective truck bolsters, which side sills change their contour near their respective ends to tightly fit around the supporting "angles" for the slope sheets.

Still another object of the invention is to provide a novel construction for the intermediate bolsters which are likewise composite in form, the center plates of these bolsters being tied to the upper edges of the sides of the car.

Still another object of the invention is to provide a special form of cross bracing intermediate of the ends of the car.

Still another object of the invention is to provide special corner posts for the ends of the car which receive the ends of the end side sheets.

Still another object of the invention is to provide a car of maximum capacity having inwardly diverging ends for the application of safety appliances, and at the same time provide means for bracing the car beneath the slope sheets, bracing the bolsters over the side bearings, and for also bracing the car throughout its length.

With these and numerous other objects in view, which will be described more in detail as the specification proceeds, the invention consists in certain new and novel arrangements and combination of parts as will be hereinafter more fully described and pointed out in the claims.

Referring now more particularly to the drawings, showing a preferred embodiment of my invention, Fig. 1 is a diagrammatic top plan view of the freight car.

Fig. 2 is a diagrammatic side view of the car.

Figure 6:
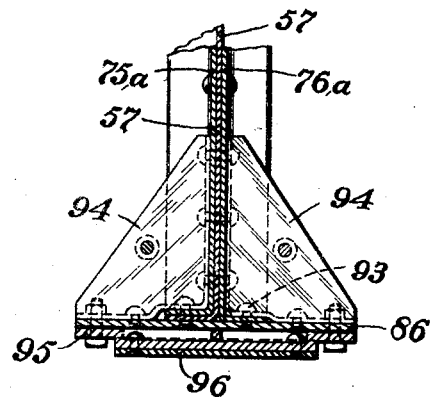
Fig. 6 is a fragmentary sectional view taken on the line 6—6 of Fig. 5.
Figure 6A:
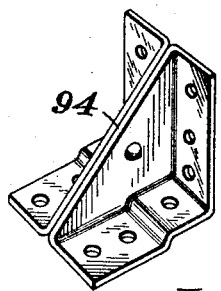

Fig. 6ª is a perspective of the braces shown in Fig. 6.

Figure 7:
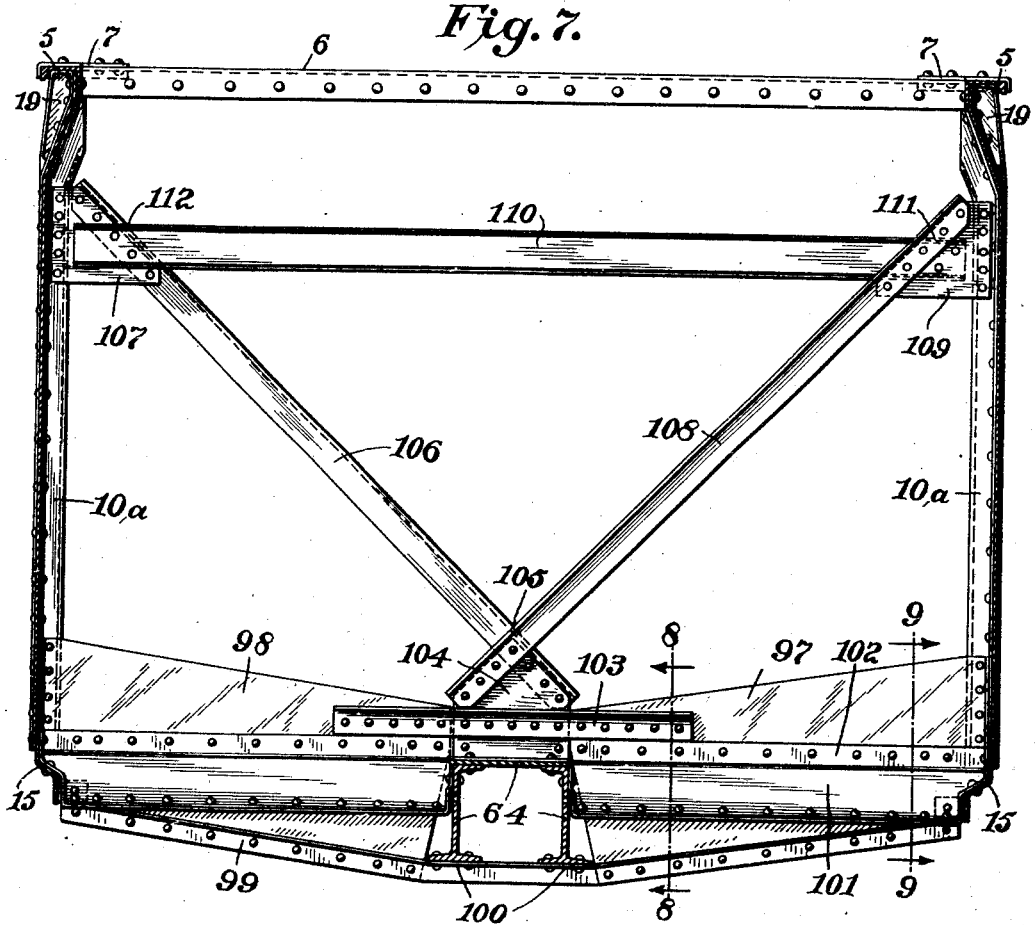

Fig. 7 is a transverse sectional view showing intermediate bolsters in elevation.

Figure 8:
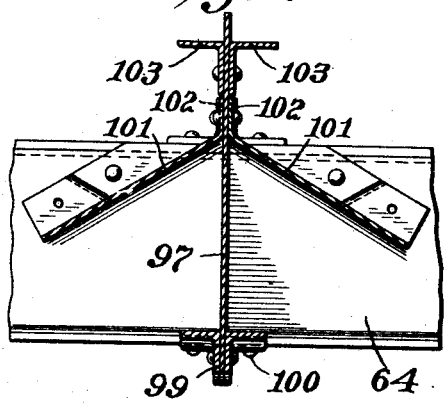

Fig. 8 is an enlarged sectional view taken on line 8—8 of Fig. 7.

Figure 9:
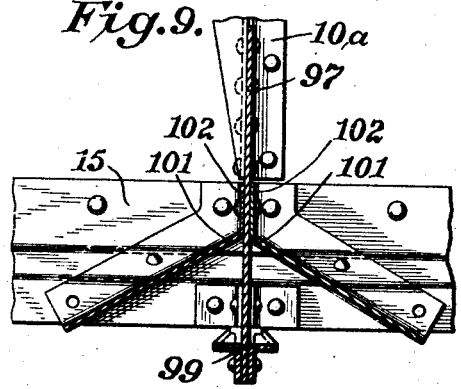

Fig. 9 is a similar view taken on line 9—9 of Fig. 7.

Fig. 10 is a side elevation of the car near its one end.

Fig. 11 is a fragmentary section of the corner post near its upper end taken on line 11—11 of Fig. 10.

Fig. 12 is a sectional view taken on line 12—12 of Fig. 10, showing the angularity of the corner post at this point.

Fig. 13 is a fragmentary section on line 13—13 of Fig. 10, showing the arrangement of the Z-bar.

Fig. 14 is a similar view taken on line 14—14 of Fig. 10, showing the decreasing flare of the side end sheet.

Fig. 15 is an enlarged transverse sectional view through the bolster showing the construction of the bolster and the manner of supporting the slope sheet.

Fig. 16 is an enlarged sectional view taken on line 16—16 of Fig. 10 showing a fragmentary portion of the end plate, side plate, Z-bar, and the flare of A and B angles, the corner post and slope sheet.

Fig. 16ª is a fragmentary sectional view showing a small casting for the Z-stake, B angle, and slope sheet, the casting being shown in dotted lines in Fig. 16.

Fig. 17 is an enlarged sectional view taken on line 17—17 of Fig. 10.

Fig. 18 is a fragmentary sectional view on line 18—18 of Fig. 10 showing the angularity of the angle bar at this section.

Fig. 19 is a similar view taken on the line 19—19 of Fig. 10.

Fig. 20 is a similar view taken on the line 20—20 of Fig. 10.

Fig. 21 is a vertical sectional view taken on line 21—21 of Fig. 10.

Fig. 22 is a perspective of an end side sheet.

Fig. 23 is a perspective of one of the bracing angles which I term "angle A".

Fig. 24 is a perspective of one of the supporting angles, which I term "angle B".

Fig. 25 is a fragmentary perspective showing the end side sheet, slope sheet, and angle A.

Fig. 26 is a fragmentary perspective of one end of the side sill.

Fig. 27 is a sectional plan of the body bolster.

Fig. 28 is a side elevation of the center and end sheets of the composite bolster showing the bolster in its partly assembled position.

Fig. 29 is a view showing a right hand reinforcing plate for the bolster, and also showing this plate from the opposite sides.

Fig. 30 is a similar view showing the reinforcing plate that is disposed directly behind the plate shown in Fig. 29.

Fig. 31 is an enlarged fragmentary vertical section through one end of the car showing the slope sheet and associated parts.

Fig. 32 is a fragmentary sectional plan taken just above the slope sheet, A and B angles, and associated parts.

Fig. 33 is a perspective view of "angle A" viewed from the inside, similar to Fig. 25.

Fig. 34 is a fragmentary inside view of the top of the Z-bar showing the top rail, end side sheet and normal side sheet, and Fig. 35 is a perspective of one of the brackets for the top rail and Z-bars.

Figure 4:
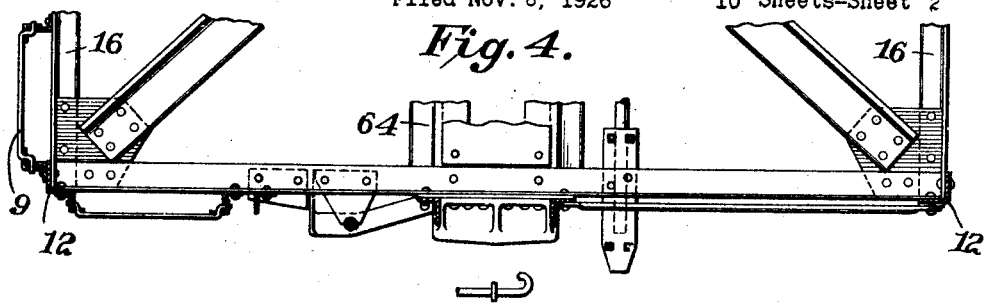
Fig. 4 is a sectional view taken on the line 4—4 of Fig. 3.
Figure 3:
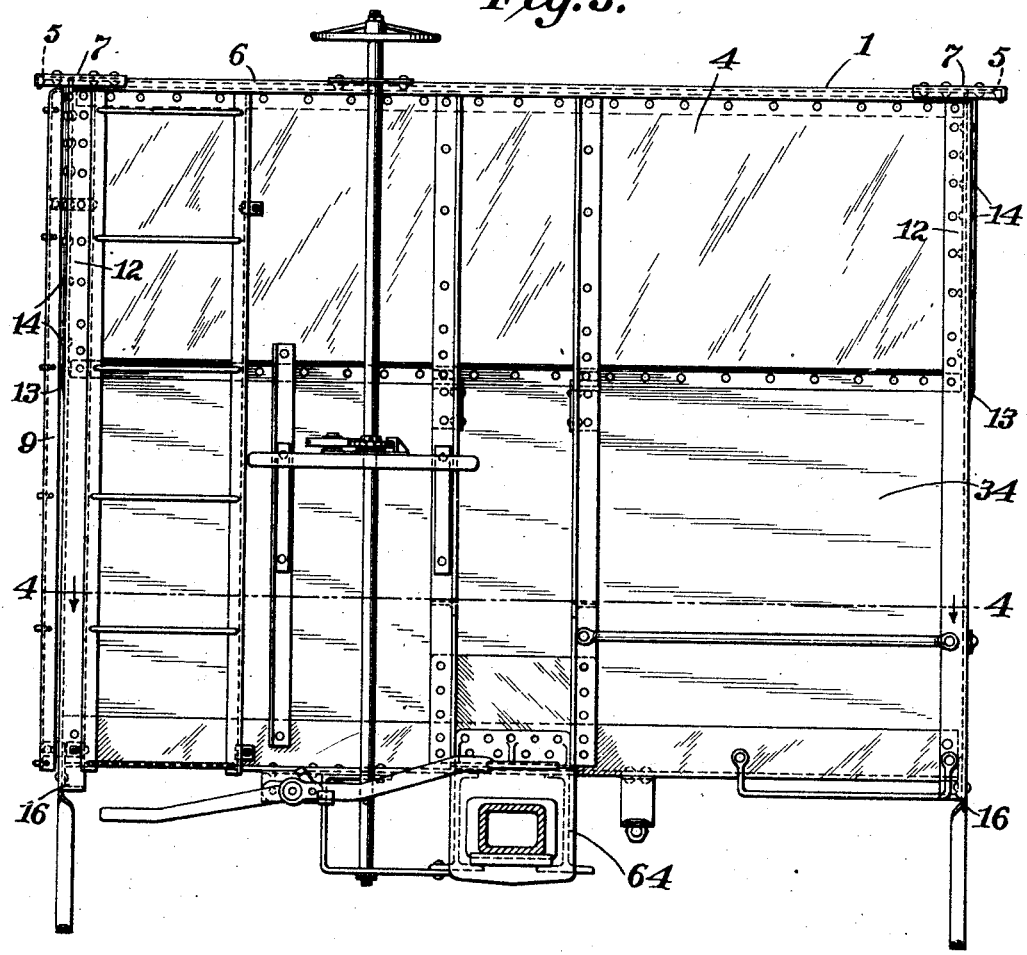
Fig. 3 is an end view of the car.

Referring now to Figs. 1, 2 and 3 of the drawings, there is shown a freight car 1 with the hoppers 2, the steel sides 3 and ends 4. As may be seen in Fig. 1, top rails 5 are provided which extend parallel throughout their length and are secured to the end top rails 6, corner braces 7 being riveted to the rail to strengthen the same at these corners.

It might be mentioned at this point in the specification, that the car, in its broadest aspect, is somewhat similar to my co-pending application, filed on March 3, 1926, bearing Serial No. 91,951, now Patent No. 1,661,863, Mar. 6, 1928.

In Fig. 1, there is shown in dotted lines the end side sheets 8 and it will be noticed that they extend inwardly to provide a space within the normal sides of the car so that the safety appliances, such as the ladders 9 may be placed opposite these end side sheets and still fall within the normal sides of the car.

Of course it is desired to have a car of maximum capacity, but at the same time, safety appliances must be used and spaces within certain clearances must be provided for these appliances.

As may be seen in dotted lines in Fig. 1, two Z-bars 10 are provided near each end of the car, their lower ends being positioned directly over bolsters 11 (see Fig. 2), the normal side plates or sheets of the car extending between these respective Z-bars, while the end side sheets 8 of the car extend from these respective Z-bars to corner posts 12 (Fig 2), as will be readily understood.

It might be well to refer to these corner posts 12 more in detail at this point as they are different in form than the ordinary corner posts. They are all four the same, so a description of one is a description of all.

Referring, therefore, for the moment to Figs. 3, 10, 11 and 12, it will be noticed that each corner post is formed of an angle member, right angular in form to a point nearly half way of its length, but at a point 13 one of the legs of the angle is flared as may be seen in Fig. 11, and this flare extends throughout the remainder of the length or height of the corner post. It will be remembered that each end side sheet 8 as heretofore referred to briefly, and as shown in dotted lines in Fig. 1, extends at an angle from the Z-bar to the end of the car, and to accommodate these end side plates, the corner posts are each flared to receive their plate so that the rivets 14 will tightly bind the inclined side sheets to their leg of the corner posts. This flare in the end or corner posts may be seen in Fig. 3, and is of importance as a construction of this kind forms a stronger structure than if the angles or corner posts were simply ninety degrees throughout their length.

Still referring to Fig. 10, it will be noticed that the side sill 15, which will also be mentioned more in detail as the specification proceeds, terminates at the Z-bar 10, and it will be understood that the opposite side and opposite end of the car are arranged in a similar manner to the side and ends shown in Fig. 10.

From the end corner post 12, and extending back to the Z-bar are the angle bars 16, while push pole pockets 17 may be seen as secured to the angle bars and the Z-bar. In Fig. 17, I have shown a section taken on the line 17—17 of Fig. 10, showing the manner of fastening the bracket 39 later to be mentioned to the Z-bar 10 and the respective position of the side sheets 3 of the car, while the dotted lines show the position of the end plate 8. In this view, also, a portion of the bolster 11 is shown which will be hereinafter described more in detail.

Referring now more in detail to the several Z-bars 10, which are all similarly formed, and all similarly arranged, and referring to Figs. 10 and 13 in particular, it will be seen that the Z-bars 10 extend from the body bolster and end of the side sills to the top of the car, at which point they are cut off, as may be seen in Fig. 13, and also slope inwardly. At a point above the top edge of each Z-bar there is the vertical flange or portion of the side sheet to which is riveted the top rail 5, the rivet also passing through an upper portion of the end side sheet 8 and through a flange of a brace 19 which is designed to fit up under the top rail 5, as may also be seen in Fig. 13.

End side sheets.

One of the principal parts of the invention is the formation of the end side sheets 8, and in Fig. 22 the perspective view shows clearly the formation and outline of this plate or sheet. This sheet is preferably formed of steel and may be stamped out on large presses, say of 100 ton capacity. The sheet comprises the main body portion 20 which extends at an angle from its flat portion 21, which portion 21 is of sufficient width to receive its respective Z-bar 10. Rivet holes 22 will be provided for the reception of rivets which will also pass through one leg of the Z-bar. Along the upper edge of the body portion 20 and its inner edge 21, a part of the metal 23 is struck inwardly and upwardly (considering the plate in its set position), while along the upper edge of this portion 23, the metal again extends upwardly forming the rim or flange 24, which will likewise be provided with rivet holes 25 throughout its length.

The upwardly and inwardly extending portion 23, it will be noticed, is relatively wide at its inner end, that is, where it merges with the edge 21, and decreases in width, or in other words, vanishes to the point 26, where it aligns itself with the edge 27 of the body portion 20 and the edge 28 of the flange 24. Rivet holes 29 are also provided along the edge 27 and along the lower edge 30 of the body portion.

The entire outer edge (vertically extending edge) therefore, of the end side plate is in the same vertical plane, so that it may fit within its corner post, but it is to be remembered that the surface of the portion 21 is in angular relation with the body portion 20 as these end side plates must extend from the Z-bars slightly inwardly and towards each other to provide the clearance or space for the reception of the safety appliances.

As heretofore mentioned, the edge 21 will be riveted to the Z-bar (that is to one leg of the same) and the inwardly and upwardly sloping portion 23 will be riveted to the upper inclined portion of the Z-bar, while the flange 24 will be riveted to the vertical upper portion 18 of the side sheet and to the brace or bracket 19, which bracket is to be placed under the top rail 5, as may be seen in Fig. 13.

In Fig. 14 there is shown a section taken on line 14—14 of Fig. 10, wherein it will be noticed that the portion 23 has decreased in width, as this section is taken nearly midway of the length of the end side sheet, and the portion 23, of course, extends towards the vanishing point 26.

By forming these end side sheets as described, a relatively strong construction is obtained; a car with reduced ends is provided to thereby give maximum capacity, and at the same time room is provided for the safety appliances. Finally, by flaring and merging the portion 23 coal will not settle in any corners or will be in any way hindered, but on the other hand will be helped in its discharge from the car, if the same is discharged by inverting the car, which is a common practice on some of the coal carriers that run to tide water.

"Angle A".

Referring now to what I term "angle A" there is shown a support and connecting means in the form of a trough which is designed to be secured along its upper edge to the lower edge of the end side sheet 8. It will be understood, of course, that there are 4 of these angles, two at each end of the car, and a description of one will suffice for all of them.

This angle A is thus designated to distinguish from another angle trough, and the latter will be designated throughout the specification and claims as "angle B".

One of the ends of this angle A is properly cut on its upright leg 32, as at 33, to fit within the corner post 12, as it will be remembered that this "angle A" is connected to a corner post, to the end side sheet 8, to the Z-bar 10, and with the slope sheet 34, and with the bolster 11.

As may be seen in Figs. 23 and 10, this "angle A" has a tapering portion 31 having the vanishing point a, and widens out at its opposite end to its extreme width b from which point it extends back in triangular formation to the point c, flush with the corner.

The widening of this angle may also be clearly seen in Fig. 25, the one leg 32 being riveted to the lower edge of the body portion 20 of the end side sheet 8, while the opposite leg 35 of the trough or angle A extends under the slope sheet 34 and is tightly riveted thereto. The purpose of this angle A is to tie the end side sheet with the slope sheet and also to support the slope sheet and to provide an angular portion, that is between the points a and b, (Fig. 23) so that the coal when poured into the car will quickly slide into the hoppers and also facilitate the quick removal of the same, if the car is discharged by inverting.

Referring to the opposite end of the "angle A", that is, the end 36, it will be noticed that the upright leg 32 is slightly offset as at 37 to accommodate the Z-bar 10 and the side plates 3 of the car so that they may fit within this depressed portion adjacent the end side sheet 8.

In Fig. 19 there is shown a section taken through the angle A, the upper leg shown being riveted to the side end plate 8, and the lower leg being riveted to the slope sheet 34.

The tapered portion 31 is shown as of a certain width which has increased as shown in Fig. 20, as this view is taken on the line 20—20 of Fig. 10, and at the point b of the angle, or in other words, at the widest point of the tapered or flared section.

Referring to Fig. 16, there will be noticed a small casting 38 designed to be riveted to the Z-bar 10, and angle 39 to thereby brace all of the several parts, and form a tight closure at this junction.

In Fig. 15, the lower end of the "angle A" is shown, and it will be noticed that it is also riveted to the slope sheet 34. It will be understood that the Z-bars 10 are arranged near the four opposite corners of the car and smaller Z-bars 10$^a$ are arranged on the sides intermediate of the four larger Z-bars 10.

It also will be noticed in Fig. 15 that there is a small plate 40 that is riveted to the slope sheet 34, this plate being located right over the bolster, and in fact forming a part thereof and extends on a line beneath the adjacent ends of the angles A and B.

It might also be mentioned at this point that the slope sheet 34 is one large sheet extending with its parallel edges down over the bolster to its respective hopper and is cut out centrally to receive the center sill, as may be seen in Fig. 32. In this manner the two angles A are tied at their respective ends to the corner posts and to the Z-bars at the opposite sides of the car, thus rigidly supporting the slope sheets and at the same time tying the end side sheets to the slope sheets.

In the fragmentary view, Fig. 18, the slope sheet 34 is shown as fastened to the "angle A", that is, to the leg 35 while the opposite leg 32 of "angle A" is riveted to the end side sheet 8 and in turn riveted to the corner post 12.

"Angle B."

The supports that I term "angles B" which supports, it will be understood, are used on each side of the car and at each end of the car in conjunction with the "angles A", are similar in construction to the "angles A", in that they each comprise an upright leg 41, and a further leg 42, to be riveted to the slope sheet, while there is an indented portion 43 which is substantially the same width throughout its length and does not taper as does the corresponding portion of the "angle A".

At a point 44, however, where the indentation or depressed portion starts, it will be seen that there is a wall 45, which is triangular in shape, extending from the outer surface to the upright leg, then inwardly to the end of the portion 43, while there is a similar wall 46 at the opposite end of the "angle B", as may be understood from the perspective view of Fig. 24. The one end 47 of this "angle B" is cut out at 48 so as to fit the Z-bar 10, while the opposite end 49 will be cut out and shaped to fit around the side sill 15, as may be seen in Figs. 31 and 32.

I have shown a plurality of rivet holes 50 in this "angle B", and it will be understood that rivets will pass through these holes into the side sheets 3, into the Z-bar 10 and into the side sill 15, and they also provide means for riveting the slope sheet 34 to this "angle B".

As far as the specification has proceeded, it will be understood that these supports that I term "angles A" and "angles B" extend on each side of the car from the corner posts to the Z-bars 10 and then to a point past the body bolsters and down to the side sills 15. These angles are supported by the body bolsters which will be shortly described, and form a rigid construction for the end of the car and also help to properly support the slope sheets. They also do away with any pockets or square corners within the car so that the coal will freely slide to the hoppers or will freely slide out of the hopper if the car is to be inverted when discharging.

In Fig. 21, there is shown a section of the angle B looking in the direction of the arrows, (Fig. 10) and it will be noticed that the lower portion of the "angle B" fits snugly against the side sill 15. In this view is also shown the manner in which the side sill changes its contour or formation from a point opposite the body bolster to a point opposite the ends of the "angle B".

*Side sill.*

Figure 5:
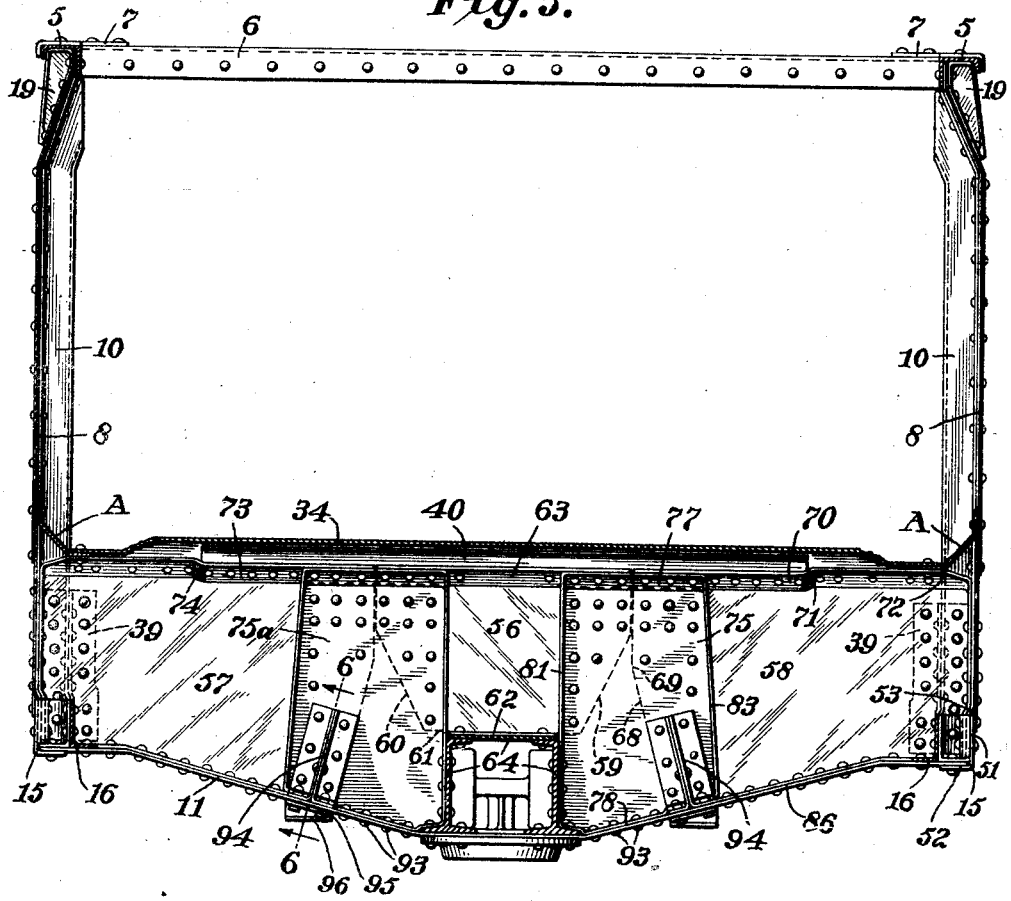
Fig. 5 is a transverse sectional view through the car showing the body bolster in elevation.

The construction of the side sill 15 may be possibly more readily understood by reference to Figs. 10 and 21, and to the perspective shown in Fig. 26. In Fig. 10 there will be seen the upper leg 51 and the leg 52 that extends at right angles thereto, and this is also seen in Fig. 5.

There is a slight offset 53 in the Z-bar 10 so that the end of the side sill may snugly fit the Z-bar 10, while at the point 54 there is started an offset or angular web 55 which extends throughout the length of the side sill to a respective position at its other end, wherein the construction is again duplicated so that the sill may likewise be fastened to the Z-bar and bolster. In other words the cross section of the side sill at its center would present an upright leg, an inwardly sloping portion, and a downwardly extending leg parallel with the upright leg, but as the sill approaches its opposite ends, the web portion decreases so that the opposite ends of the sill are substantially at right angles to each other.

*Body bolster.*

Referring now to the body bolster 11 which also is designed to support the slope sheet 34, and referring in particular to Figs. 5, 6 and 27–30 inclusive, it will be seen that this bolster is a composite one made up primarily of three main pieces, which I term a center piece 56, an end piece 57, and another end piece 58. The center piece 56 comprises a steel plate having the tapered edges 59 and 60, the bottom edge 61, provided with a flange 62, and another flange 63 on its upper edge. The flange 62 is designed to extend right above the center sill 64 and may be seen in Fig. 5.

Referring now to the right hand end piece 58, it will be seen that it comprises an irregularly shaped plate having a slightly reduced portion 65 for the reception of the end of the side sill 15, while at a short distance from this point, that is, at the point 66, the edge widens and extends downwardly to the corner 67 where it merges with the edge 68, then extends upwardly to the point 69 at an angle where it then again extends vertically.

The upper edge of the end piece 58 is provided with a flange 70, which registers when in position with the flange 63, there being a slight offset as at 71, after which the flange continues to the point 72 and is slightly tapered and merges with the right hand edge of the plate.

The plate 57 is of similar construction, but arranged to be oppositely positioned so that its flange 73 will register with the flanges 63 and 70. An offset portion 74 is provided, so that the space between these two offsets will accommodate the small reinforcing plate 40 heretofore mentioned. This plate 40, in turn, it will be remembered is riveted to the slope sheet 34 that extends from the end of the car down to the hopper. The angle of the flanges 73, 63 and 70 may be clearly discerned in Fig. 15, they following the angle, of course, of the inclination of the slope sheet and reinforcing plate.

Now, to tie these several plates 56, 57, and 58 of the bolster together, and to strengthen the bolster, at a point over the center sill 64, and also to form special reinforcing means for side bearings, I have provided two gussets or reinforcing plates 75 and 76, these being shown in position in Figs. 5, 16 and 27. These plates are slightly different in contour, so they will be described individually.

Before describing the gusset plates specifically, it will be understood that there will be two plates of the kind shown in Fig. 29, and two plates of the form shown in Fig. 30. It will also be understood that the two plates of the form shown in Fig. 29 will consist of a right and left hand plate, as these extend on the one side of the center and end plates of the bolster, and two plates of the form shown in Fig. 30 will extend on the other side of these center and end plates, and likewise the plates as shown in Fig. 30 will be right and left handed.

In other words, I have shown the right hand plate of each pair and there will be a left hand plate also for each pair.

Referring to Fig. 29, it will be seen that the plate 75 has a sloping upper edge 77, while the lower edge 78 is inclined and provided with two offset portions 79 and 80. One edge of the plate is provided with the flange 81 and tapers off as it approaches the point 82 on the upper edge of the plate, while the other edge of the plate is provided with the flange 83 which is parallel throughout its length with the body of the plate. This gusset plate is shown in position in Fig. 5, and it will be noticed that it laps over the adjacent edges of the plates 58 and 56 and is tightly riveted to these two plates while its upper flange 77 is riveted to the flanges 63 and 70 of the two said plates.

The bottom edge of the gusset is also provided with a flange 78 throughout its entire edge, and this flange, with the offset portion 79, rests on the corner 67 of the flange about the lower edge of plate 58, while the offset portion 80 fits over the flange of the beam of the center sill 64.

A gusset plate 75ª, similar to 75 except that it is a left-hand plate instead of a right hand one, is riveted to the plates 56 and 57 as may be clearly seen in Fig. 5, these two plates 75 and 75ª, together with the plate 56 enclose three sides of the center sill, while a bottom plate 86, to be shortly mentioned, extends entirely across the bolster and under the center sill.

Referring now to the gusset plate 76, which appears on the other side of the bolster from that side just described, it will be noticed that there is no upper flange provided, the side flange 87 tapering upwardly and merging with the top edge of the plate.

The one corner of this plate is offset as at 88 and the bottom tapers upwardly as at 89 and is offset again at 90. The small flange 91 extends around the side as may be seen in Fig. 30, and the lower edge of the plate is also provided with a flange 92, this flange, of course, having the offset portions corresponding to the lower edge of the plate where the offsets 88 and 90 occur.

There will be a similar adjacent plate 76ª but in this instance the plate will be a left hand one, which will be readily understood.

The lower flanges of all of the plates 75, 75ª, 76 and 76ª, will be riveted as at 93 to the sheet or bottom plate 86, as may be seen in Fig. 15.

As may also be seen in Fig. 5, additional braces in the form of triangular plates or brackets 94 are riveted to the plates 75 and 76, and it will be understood that there are also two similar ones riveted to the plates 75ª and 76ª, so that there will be five thicknesses of metal on a line drawn through each of these gusset plates. In other words there will be first a bracket 94, a plate 75, an end plate 58, a plate 76, and a further bracket 94. This construction will appear, of course, to the right of the bolster and to the left of the bolster. These brackets at their bottoms are riveted to the bottom flanges of the respective gusset plates 75 and 75ª, through the plate or strap 86, while there is an additional plate or support 95, as may be seen in Fig. 6, on which there is riveted a wear plate 96. This wear plate 96 of course, is the wear plate for the side bearing that is mounted on the truck bolsters.

With the foregoing construction, it will be noticed how well the bolster 11 is constructed directly over the side bearing to thus rigidly strengthen the car body at this place.

In Fig. 6, there is clearly shown the manner in which the gusset plates are slightly offset on their bottom edge to accommodate the lower flanges of the several plates 75, 75ª, 76 and 76ª.

It will be seen, therefore, that I have produced a novel form of composite truck bolster to accommodate the Z-bars at the sides and also accommodate the side sills. Further, the upper part of the bolster is designed to lend support to the angles A and B and to the slope sheet. Finally, the bolster is especially strong at a point right over the side bearings of the truck bolster.

*Cross bearer construction.*

Referring now to Figs. 7, 8 and 9, and for the moment to Fig. 7, there is shown a section taken through the car intermediate the body bolsters in which there will be seen a cross bolster formed of the three plates 97, 98 and 104, which extend from the respective side sills to the center sill.

A bottom plate 99 also extends from the opposite ends of two remote plates and is riveted to the center sill at 100. In Fig. 9, which is a section taken on line 9—9 of Fig. 7, the plate 97 may be seen which abuts one of the side Z-bars, while abutting this plate on its opposite sides are the two braces 101 which extend in the opposite directions and have the upwardly extending portions 102 to lie parallel with the plate 97. The construction is also shown along the section line 8—8 of Fig. 7, looking in the direction of the arrows, and there will be noticed the extra braces 103, which are riveted in this instance to the center plate 104, which plate is also a composite part of this cross bearer, being disposed centrally of the plates 97 and 98 as before mentioned.

The plate 104 is in turn directly over the center sill, and the braces 103 are not only riveted across the plate 104, but also riveted to the two plates 97 and 98 as may be seen in Fig. 7.

The plates 97 and 98 extend upwardly from below the normal level of the car floor and the coal that is first poured into the car will strike against these small partitions and be guided either in one direction or the other into the hoppers. These braces 101 may be clearly seen in Fig. 2 of the drawing, and of course, they not only direct the coal, but their principal function is to brace the car from side to side.

Referring for the moment to the center plate 104 of this composite cross bearer, it will be seen that it tapers from its opposite sides to the point 105, while to one side of the plate is secured the brace 106 which in turn is connected at its upper end to a tie plate 107. This plate, in turn is securely riveted to one face of the Z-bar. In a like manner, the brace 108 is riveted at its lower end to the opposite face of the plate 104, while at the upper end of this brace is connected the small plate 109 fastened to the like Z-bar. Also extending in a horizontal position from the plate 107 to the plate 109 is the cross beam or tie 110 which is preferably of I-beam construction, the upper and lower leg of the I-beam being cut away on its one surface as at 111 so that the upper end of the brace 108 may be riveted to the web of this I-beam 110. In a similar manner, the brace 106 passes on the far side of the beam 110 on the left hand side of the car (Fig. 7), as may be seen at the point 112.

This intermediate construction of the car is a very strong one as the sides of the car are well braced, while the center plate of the cross bearer is also tied to the sides of the car through these diagonally extending braces 106 and 108.

Résumé.

From the foregoing it will be seen that I have produced a hopper car of novel type and construction wherein the opposite ends are offset; thereby providing a maximum capacity car, and at the same time providing spaces to accommodate safety appliances which will still fall within the normal sides of the car. Again, I have produced this effect by constructing a special form of end side plates that are in turn riveted to Z-bars, the end side plates also being so formed that the coal may be quickly discharged from the car, if the car is inverted.

Furthermore, I have made the end side plates so that they can be stamped out relatively quickly on large presses and at a minimum expense.

Also, the corner posts are right angular for a portion of their length and then slightly diverged from a right angle to accommodate the near edges of the end side pieces.

Cooperating with the end side sheets and the slope sheets are a novel type of what I term A and B angles that are trough-like in structure to assist in the flow of coal down the slope sheets to the hopper. Again, a composite type bolster is shown cooperating with the Z-bars, with the "angles," and the slope sheets to support these angles A and B and the slope sheets. The bolster in itself is also of a novel form to provide a maximum of supporting power and to also provide great strength directly over the side bearings. The side sills, in turn, cooperate with the "angles B" and the Z-bars at the sides of the car as has already been described.

The intermediate sections of the car are well braced to withstand the load and lateral strain naturally incident to a large hopper car.

I am aware that it is old to provide different forms of offset ends in cars of this type and I do not claim my invention broadly to a car with offset ends.

It will be understood that the drawings and specification relate and show a preferred embodiment of the invention, but many minor changes in construction and formation are contemplated and might be made without in any way departing from the spirit and scope of the invention.

Having thus described my invention, what I claim as new and desire to secure by Letters Patent is:

1. A freight car having end side sheets extending inwardly towards the end of the car and a portion of the end side sheets sloping inwardly and upwardly.

2. A freight car having end side sheets extending towards each other and towards the end of the car, to thereby provide a space for safety appliances within the natural sides of the car, and an upper portion of said end side sheets sloping upwardly and inwardly towards each other.

3. A freight car having end side sheets extending slightly inwardly to the end of the car, a portion of the end side sheets sloping inwardly and upwardly, and a further vertical portion merging with the portion that slopes inwardly and upwardly.

4. An end side plate for a car comprising a portion adapted to extend flush with the normal side of the car, the said plate also provided with a portion extending at an angle thereto and adapted to be fastened along its one edge to a corner post of the car, the upper portion of said plate being bent inwardly and upwardly with respect to the first mentioned portion of the plate and decreasing in width as it approaches the edge that is adapted to be received by the corner post.

5. An end side plate for a car comprising a vertical portion adapted to extend flush with the normal side of the car, the said plate also provided with a portion extending at an angle thereto and adapted to be fastened along its one edge to a corner post of the car, the upper portion of said plate being bent inwardly and upwardly with respect to the first mentioned portion of the plate, said upper portion decreasing in width as it approaches the above mentioned edge, and the extreme upper edge of the plate lying in a vertical plane.

6. An end side plate for a freight car, increasing in width from its one edge to its opposite edge, one edge of the plate extending at an angle to the remainder of the plate, the upper portion of the plate increasing in width from its one edge towards its other and also extending inwardly and upwardly, and a small vertically extending portion formed along the top edge of the plate.

7. An end side plate comprising a body portion 20, the end portion 21, the inwardly and upwardly sloping portion 23, and the vertically extending portion 24.

8. A freight car having its end sides restricted, Z-bars defining the points of the beginning of restriction, slope sheets extending from the restricted ends of the car towards the center of the car, and trough-like angles extending at the sides of the slope sheets to the restricted portion of the sides of the car.

9. A freight car having sides, corner posts and Z-bar stakes, end side plates extending at an angle to the normal sides of the car between the Z-bars and said corner posts, said corner posts having their upper portions flared to receive the respective edges of the said end side plates.

10. A freight car having sides, corner posts and Z-bar stakes near the corner posts, end side plates extending at an angle to the normal sides of the car between the Z-bars and said corner posts, said corner posts having those portions flared that receive the respective edges of the said end side plates.

11. A freight car having sides, end corner posts, Z-bar stakes near the corner posts, further Z-bars intermediate the first mentioned Z-bars, side sills extending between the first mentioned Z-bars on the respective sides of the car, and said side sills extending in three planes intermediate their opposite ends.

12. A freight car having sides, end corner posts, and Z-bars located a short distance from the respective end corner post, the normal sides extending between the respective Z-bars, end side plates extending inwardly from the respective Z-bars to the ends of the car to thereby provide a space between the normal sides of the car and the ends, side sills extending between said respective Z-bars on the opposite ends of the car, the said side sills being substantially right angular at their respective ends and extending in three planes in cross section, centrally of their length.

13. A freight car having restricted end side portions, side sills extending throughout the non-restricted portions of the sides of the car, and said side sills changing in form from right angular formation near their ends to a formation having a web and two oppositely extending legs throughout the greater part of their length.

14. A freight car having sides and restricted end portions, side sills extending throughout the length of the non-restricted portion of the car, and the greater portion of said side sills having two legs extending in the opposite direction, and a connecting web therebetween.

15. A freight car having the ends of its sides tapering inwardly, side sills extending along the normal sides of the car and said side sills being right angular in section at their opposite ends, and flared throughout the great part of their length to form three outer surfaces existing in separate planes.

16. A freight car of the hopper type comprising a center sill and side sills, Z-bars located at the opposite ends of said side sills, end side plates extending from the respective Z-bars inwardly to the ends of the car to provide a space within the normal parallel sides of the car, intermediate Z-bars connected to said side sill, and the said side sills being of irregular angular shape.

17. A freight car comprising restricted end portions, side sills extending between the non-restricted portions of the car, the ends of the respective sills being substantially right angular in cross section, and having a sloping central web between the two sections throughout the greater part of their length.

18. A freight car having end corner posts of angular construction, the angle of the legs of the posts being greater than a right angle, the said car provided with sides, end side plates extending from these sides to the respective corner posts, and the respective end side plates lying parallel with one leg of their adjacent corner posts.

19. A freight car having end corner posts and Z-bars situated near the respective corner posts, end side plates extending from the respective Z-bars to their adjacent end corner posts, and one leg of each of the said corner posts being flared to lie parallel with the major portion of its adjacent end side plate.

20. A freight car having restricted end portions, Z-bars defining the points of restriction, end corner posts each having one of its legs flared, end side sheets, each having one edge connected to the flared leg of said corner posts to lie parallel therewith, and the opposite edge of each end side plate lying flush with the normal sides of the car.

21. A freight car having four end corner posts and four Z-bars situated at a distance from said end corner posts, said Z-bars being inwardly inclined at their upper ends, end side sheets having likewise upwardly inclined portions secured to the respective inclined portion of the Z-bars and the end side plates converging from the Z-bars to the said corner posts.

22. A freight car having four end corner posts and four Z-bars respectively situated at a distance from said end corner posts, each of said Z-bars extending in an upright position and inwardly inclined at its upper end, end side sheets each having a similarly inclined upper portion and secured to the respective inclined portion of the Z-bars, one edge of each of said plates lying parallel with its adjacent Z-bar and secured thereto, and the said end plates converging from their respective Z-bars to the said corner posts.

23. A freight car having end corner posts at its one end and two Z-bars spaced along the sides of the car and at a distance from the said corner post, an end side sheet extending from each of said Z-bars to the respective end corner posts, the Z-bars and the upper portion of the end plates extending inwardly and upwardly and the said inwardly and upwardly extending portions of the end side plates decreasing in width as they approach the said end corner posts.

24. A freight car having corner posts at its one end, said corner posts each having a flared portion, end side sheets secured respectively along their one edge to the flared portion of said corner posts, Z-bar stakes spaced from said end corner posts, the free edges of said end side sheets secured to one leg of the said Z-bar stakes, the upper portion of said end plates where they are fastened to said Z-bars being inclined inwardly and upwardly, and the said Z-bars at their upper portion being similarly inclined.

25. In a freight car, an end corner post, a Z-bar stake at the side of the car and spaced from said end corner post, an end side plate having one edge secured to the end corner post and its opposite edge secured to the Z-bar, the said Z-bar stake being inwardly inclined at its upper portion and the upper edge of the end side plate being likewise inclined along the edge adjacent the upper end of said Z-bar, said upwardly inclined portion of the end plate decreasing in width as it approaches the end corner post.

26. In a freight car, an end corner post, a Z-bar stake at the side of the car and spaced from said end corner post, an end side plate having one edge secured to the end corner post and its opposite edge secured to the Z-bar, the said Z-bar stake being inwardly inclined at its upper portion and the upper edge of the end side plate being likewise inclined along the edge adjacent the upper end of said Z-bar, said upwardly inclined portion of the end plate decreasing in width as it approaches the end corner post, and the uppermost edge of said plate extending in a vertical position, a bracket riveted to said end side plate, and a top rail enclosing the upper edge of said plate and said bracket.

27. A freight car having spaced sides and restricted end side plates, a slope sheet extending downwardly from each end of the car, trough-like angles secured to each slope sheet and to the restricted end side sheets of the car.

28. A freight car having spaced sides, ends, end side sheets converging from the normal sides of the car to the ends, trough-like angles secured to the end side sheets, and a slope sheet also secured to and between the said respective trough-like angles.

29. A freight car having spaced sides, end side sheets converging to thereby form spaces within the normal sides of the car, slope sheets secured to the ends of the car and trough-like angles secured to the inner surface of the respective end side sheets, and the said slope sheets supported on their opposite edges by the said trough-like angles.

30. A freight car having sides, end side sheets at the opposite ends of the car extending slightly inwardly towards each other as they approach the ends of the car, a trough-like angle having a portion pressed inwardly and increasing in width from its one end to its other secured to each of said side sheets, and a slope sheet riveted to and between said trough-like angles at each end of the car.

31. A freight car comprising in part on one side an end side sheet extending to the end of the car, a trough-like angle having one leg secured to the lower edge of said end side sheet, the bottom edge of the angle being pressed upwardly and increasing in width from one end of the angle to the other, and a slope sheet secured to another leg of said angle.

32. A freight car having sides tapering near their opposite ends, a slope sheet extending from the respective ends towards the center of the car, and two trough-like angle supports on each side of each slope sheet, which angles extend substantially throughout the length of the said slope sheets.

33. A freight car having sides, the ends of said sides converging as they approach the ends of the car, the said end sides also sloping upwardly and inwardly at the point where they start to converge, a slope sheet at each end of the car extending towards the center of the car, two trough-like angles connected to each side of each slope sheet, and each one of said pair of angles being secured to an end side plate on each side of the car.

34. A trough-like angle A having the leg 32, the leg 35, and the ever-widening portion 31.

35. A trough-like angle A having the leg 32, the flared portion 31, the leg 35, the said flare-like portion extending from $a$ to $b$ and merging sharply at $c$.

36. A freight car having at its one end corner posts, side Z-bar stakes, end side sheets extending between the respective Z-bars to the end corner posts, a slope sheet extending from the end of the car towards the center thereof, and two trough-like angles on the opposite sides of the slope sheets extending from the end of the car towards the center of the car, the inner adjacent ends of the angles being secured to their respective Z-bars, and said slope sheet supported on its opposite sides by the said trough-like angles.

37. A freight car having sides restricted at their ends, a slope sheet extending from each end of the car towards the center, Z-bars on the opposite sides of the car and defining the restricted side end portions, two trough-like angles also extending from each end of the car towards the center and positioned on each side of the car, side sills, and the said Z-bars and the lower ends of the angles secured to said side sills.

38. A freight car having on each side end side sheets 8, a trough-like angle A, a trough-like angle B, and a slope sheet 34 secured between the two sets of angles A and B.

39. A freight car having sides restricted at their ends, a slope sheet extending from each end of the car towards the center and positioned respectively between said restricted end sides, two angles on each of the respective sides at each end of the car supporting the said respective slope sheets and all of the said angles having central portions pressed inwardly to provide sloping surfaces between the sides of the car and the slope sheet.

40. A freight car having restricted end sides, and body bolsters at the respective ends, slope sheets extending over the respective bolsters, reinforced plates secured to said respective bolsters and positioned beneath said slope sheets to thereby support the same, Z bars positioned above said bolsters and trough like angles at the sides of said slope sheets and connected to said Z bars.

41. A freight car having restricted end sides, Z bars near the opposite ends of the car, composite bolsters positioned between said Z bars, trough like angles extending throughout the length of the restricted ends, slope sheets extending from respective ends of the car towards the center of the car, the said Z bars, bolsters and angles all supporting the slope sheets.

42. A freight car, end side plates at its one end, angle members secured to the inner surface of each of said plates, a slope sheet positioned and supported between said angle members, a bolster of composite form having an upper portion, adjacent said slope sheet, Z bars at the opposite ends of said bolster, supporting the lower end of said angle members and attached to said bolsters.

43. A freight car having restricted end sides, slope sheets, body bolsters partly supporting said slope sheets, said bolsters, being formed of three plates and each having its upper edge inclined to agree with the angle of inclination of the said slope sheets.

44. A freight car having in part a center sill, a body bolster comprising three plates, one of which is directly over the center sill, the other of said plates being tied to said center plate, a strap passing from one end of the bolster to the other at its lower edge, reinforcing brackets secured to said bolster plates and adapted to be positioned directly over the truck side bearings.

45. A freight car comprising a center sill and side sills, bolsters, the side sills terminating at the ends of the respective bolsters, Z-bar stakes attached to said bolsters, the said bolsters being of composite form and provided with reinforcing plates and brackets, side bearing wear plates positioned beneath said last mentioned reinforcing plates and brackets to provide a plurality of thicknesses of metal directly above said side bearing wear plates.

46. A freight car having reduced ends, a center sill and side sills, composite bolsters at the respective ends of the side sills, Z-bar stakes attached to the ends of the respective bolsters, slope sheets extending from the ends of the car towards the center, angle supports at the opposite sides of the slope sheets and secured to the said Z-bars and to the said slope sheets and said bolsters each provided with a flange at its top edge partly supporting said slope sheets.

47. A freight car of the hopper type provided with side sills and center sills and Z-bar stakes at the opposite ends of the side sills, body bolsters also adjacent the opposite ends of the side sills and slope sheets extending from the ends of the car towards the center, trough-like angles secured to the Z-bars, each body bolster having a flange along the top edge and inclined similar to the inclination of the slope sheets and secured to said respective slope sheets to thereby partly support the same.

48. A freight car having reduced end sides, the remainder of the sides being parallel, side sills on the opposite sides of the car, Z-bar stakes adjacent the ends of the said side sills, a slope sheet at each end of the car and four trough-like angles at each end of the car, said angles extending the entire length of the slope sheet and fastened to the respective side sills, Z-bars and end of the car; the said angles also fastened to and supporting the respective slope sheets, a body bolster at each end of the car and positioned between two of the said Z-bars, a reinforcing plate at the top edge of each body bolster and fastened to its slope sheet to thereby further support the said slope sheet.

49. A freight car comprising end side sheets extending towards each other as they approach the end of the car, Z-bar stakes attached to one edge of the said inside sheets, two trough-like angles each secured to its respective end side sheet and a slope sheet supported by said trough-like angles, a composite body bolster extending between the lower ends of the said Z-bar stakes, a reinforcing plate extending between the upper edge of said bolster and the slope sheet, wear plates for side bearings secured on the undersurface of the body bolster, reinforcing plates and brackets forming a part of the bolster and located directly above the said wear plates.

50. A freight car comprising restricted end sides, body bolsters, a center sill and side sills extending from one bolster to the other, wear plates for side bearings on the lower surface of said bolsters, said bolsters each of composite form and having reinforcing plates directly over the wear plates and further additional brackets secured to said reinforcing plates directly over said wear plates to thereby provide a plurality of thicknesses of metal in cross section over said wear plates.

51. A freight car of the hopper type, comprising tapering end sides, Z-bar stakes arranged along the opposite sides of the car, side sills extending between the respective Z-bars, a slope sheet at each end of the car and angular members extending from the side sills upwardly to the respective ends of the car and secured to a respective Z-bar stake, the said angular members supporting said slope sheets, bolsters extending between its two respective Z-bars and each having an upper flange inclined similar to the slope sheet for also supporting said respective slope sheets.

52. A freight car having four corner posts, end side sheets secured to corner posts, Z-bar stakes, slope sheets, the said end sheets also secured to the said Z-bar stakes, a bolster at each end of the car and having its upper edge flanged and secured to the slope sheet, the said bolsters being of composite form and each provided with wear plates for side bearings on its under surface, reinforcing plates on said bolsters and outwardly extending brackets secured to said reinforcing plates and extending outwardly over said wear plates to thereby provide the greatest number of thicknesses of metal of the bolster directly over the said wear plates.

53. A freight car of the hopper type provided with reduced ends and slope sheets, trough-like angle members at the opposite sides of the slope sheets for supporting the same, brackets in the form of castings for supporting the one end of one of said angle members on each side of the car.

54. A freight car having sides and end side sheets that extend towards each other as they approach the end of the car, two angle members on each side of the slope sheet, having trough-like sections, Z-bar stakes situated between the inner adjacent ends of the angle members and castings below the inner adjacent ends of the angle members for supporting an end of an angle member on each side of the car.

55. A freight car having sides and end side sheets that extend towards each other as they approach the respective ends of the car, a slope sheet at each end of the car, a bolster at each end of the car, the bolsters being of composite form and each having two sets of reinforcing plates, one on each side of the center sills, one of the plates of each set being provided with an upwardly extended flange to contact with a composite portion of the bolster and the remaining plates of each set having sides tapering towards their upper edges.

56. A freight car comprising a center sill, side sills, a plurality of Z-bars stakes and corner posts, the said car provided with sides tapering from the ends to the respective Z-bar stakes, composite bolsters fitting over said center sill, slope sheets extending from the ends of the car towards the center, angle members extending from the corner posts to the side sills supporting said slope sheets and the bolsters provided with inclined flanges to also partly support said slope sheets.

57. A freight car having reduced ends, bolsters, cross bearers of composite form and tie rods extending from the inner sides of the car and fastened to the said cross bearers.

58. A freight car comprising in part a cross bearer, said cross bearer formed of three plates, stakes at the opposite ends of the cross bearer and tie rods extending from said stakes to the center plate of said cross bearer.

59. A freight car comprising in part a cross bearer and Z-bar stakes, said cross bearer consisting of a centrally located plate and two end plates, tie rods extending from the opposite Z-bars and riveted to the center plate of said cross bearer.

60. A freight car comprising in part a cross bearer, Z-bar stakes, said cross bearer formed of three plates, the central plate extending above the inner adjacent ends of the other of its plates, tie rods fastened to the opposite adjacent Z-bar stakes, crossed at their lower ends and secured to the centermost plate of the cross bearer and a horizontal brace secured to the Z-bar stakes at the upper end of the tie rods.

61. A freight car comprising in part a cross bearer of composite form, side sills of irregular shape, the ends of the cross bearer being shaped to conform with the irregular outline of the side sills, Z-bar stakes at the sides of the car, said cross bearer secured at its opposite ends to the said stakes and tie rods connected with the Z-bars and the cross bearer.

62. A freight car comprising a number of Z-bar stakes arranged along its opposite sides, side sills adjacent to the lower ends of the said Z-bar stakes, corner posts, end side sheets extending inwardly from adjacent Z-bar stakes to the corner posts to provide a space for safety appliances, slope sheets extending from the ends of the car towards the center, bolsters partly supporting said slope sheets, cross bearers and crossed tie rods extending from some of the Z-bar stakes to the cross bearers.

63. A freight car having reduced ends and a plurality of Z-bar stakes along its sides, side sills, bolsters, said bolsters connected at their opposite ends to the side sills, slope sheets, said bolsters partly supporting said slope sheets, cross bearers extending between the side sills and having their ends conforming to the shape of the side sills and crossed tie rods extending from the cross bearers to the upper end of said Z-bar stakes.

64. A freight car of the hopper type having reduced ends, side sills and center sills, a plurality of Z-bar stakes extending inwardly at their upper ends, body bolsters and cross bearers of composite form, and crossed tie rods extending from near the upper ends of the said Z-bars to the centers of the cross bearers.

65. A freight car of the hopper type comprising in part reduced ends and inwardly sloping upper edges, slope sheets, and angle members extending from the ends of the car towards the center and partly supporting said slope sheets, side sills having flared portions, Z-bar stakes having their lower ends adjacent to the side sills, body bolsters partly supporting the slope sheets, cross bearers having tie rods extending from their center portion to the opposite sides of the car and cross braces extending between the opposite sides of the car near the car's upper edge.

66. A freight car of the hopper type having reduced ends and a plurality of Z-bar stakes arranged along the sides, body bolsters and cross bearers, tie rods extending from some of the Z-bar stakes to the cross bearers and cross braces extending from the Z-bar stakes and connected to the respective upper ends of the tie rods.

67. A freight car comprising in part body bolsters and cross bearers, said body bolsters and cross bearers being of composite type and formed respectively of three main plates and composite braces of triangular shape extending from the center portions of the intermediate bolsters to the sides of the car.

In testimony whereof I affix my signature.

WILLIAM E. WINE.